(12) United States Patent
Seo

(10) Patent No.: US 10,225,812 B2
(45) Date of Patent: Mar. 5, 2019

(54) METHOD FOR TRANSMITTING SYNCHRONIZATION SIGNAL FOR DIRECT DEVICE-TO-DEVICE COMMUNICATION IN WIRELESS COMMUNICATION SYSTEM, AND APPARATUS THEREFOR

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/303,377

(22) PCT Filed: Apr. 14, 2015

(86) PCT No.: PCT/KR2015/003710
§ 371 (c)(1),
(2) Date: Oct. 11, 2016

(87) PCT Pub. No.: WO2015/160167
PCT Pub. Date: Oct. 22, 2015

(65) Prior Publication Data
US 2017/0034801 A1 Feb. 2, 2017

Related U.S. Application Data

(60) Provisional application No. 62/010,998, filed on Jun. 11, 2014, provisional application No. 61/993,285, (Continued)

(51) Int. Cl.
*H04W 56/00* (2009.01)
*H04W 76/14* (2018.01)
(Continued)

(52) U.S. Cl.
CPC ..... *H04W 56/0025* (2013.01); *H04W 52/247* (2013.01); *H04W 52/248* (2013.01);
(Continued)

(58) Field of Classification Search
CPC ..... H04W 52/00–52/60; H04W 4/005; H04W 4/008; H04W 56/00; H04W 56/0025;
(Continued)

(56) References Cited

U.S. PATENT DOCUMENTS

2009/0325625 A1 12/2009 Hugl et al.
2010/0331035 A1* 12/2010 Bark ................... H04W 52/146
455/522
(Continued)

FOREIGN PATENT DOCUMENTS

CN 102246575 A 11/2011
CN 103686985 A 3/2014
(Continued)

OTHER PUBLICATIONS

Ericsson, "Synchronization Signals and Channel Design for D2D Discovery and Communication," 3GPP TSG RAN WG1 Meeting #76bis, R1-141380, Shenzhen, China, Mar. 31-Apr. 4, 2014 (Mar. 21, 2014), pp. 1-9.
(Continued)

*Primary Examiner* — Raymond S Dean
(74) *Attorney, Agent, or Firm* — Birch, Stewart, Kolasch & Birch, LLP

(57) ABSTRACT

Disclosed in the present application is a method for transmitting a synchronization signal for a direct device-to-device communication by a user equipment in a wireless communication system. Specifically, the method comprises the steps of: setting a power parameter of a synchronization signal for the direct device-to-device communication through an upper layer; receiving, from a base station, a
(Continued)

transmit power control (TPC) command for the direct device-to-device communication; determining a transmission power of the synchronization signal for the direct device-to-device communication on the basis of the power parameter and the TPC command; and transmitting the synchronization signal for the direct device-to-device communication according to the determined transmission power, wherein the TPC command is for a data channel of the direct device-to-device communication.

12 Claims, 8 Drawing Sheets

Related U.S. Application Data filed on May 15, 2014, provisional application No. 61/986,061, filed on Apr. 29, 2014, provisional application No. 61/979,495, filed on Apr. 14, 2014.

(51) Int. Cl.
| | |
|---|---|
| *H04W 52/38* | (2009.01) |
| *H04W 72/12* | (2009.01) |
| *H04W 52/24* | (2009.01) |
| *H04W 52/32* | (2009.01) |
| *H04W 88/06* | (2009.01) |
| *H04W 88/16* | (2009.01) |

(52) U.S. Cl.
CPC ....... *H04W 52/325* (2013.01); *H04W 52/383* (2013.01); *H04W 56/00* (2013.01); *H04W 72/1215* (2013.01); *H04W 76/14* (2018.02); *H04W 88/06* (2013.01); *H04W 88/16* (2013.01)

(58) Field of Classification Search
CPC . H04W 88/06; H04W 88/16; H04W 72/1215; H04W 76/14
USPC .......................................... 455/522; 370/318
See application file for complete search history.

(56) References Cited

U.S. PATENT DOCUMENTS

| | | | |
|---|---|---|---|
| 2011/0098054 A1* | 4/2011 | Gorokhov | H04B 7/024 455/452.1 |
| 2013/0324182 A1* | 12/2013 | Deng | H04W 52/281 455/522 |
| 2015/0078270 A1 | 3/2015 | Seo et al. | |
| 2015/0264588 A1* | 9/2015 | Li | H04W 56/0015 370/350 |
| 2016/0088620 A1 | 3/2016 | Seo et al. | |
| 2016/0255597 A1* | 9/2016 | Zhao | H04W 52/322 455/522 |

FOREIGN PATENT DOCUMENTS

| | | |
|---|---|---|
| WO | WO 2012/077971 A2 | 6/2012 |
| WO | WO 2013/137580 A1 | 9/2013 |
| WO | WO 2015/160167 A1 | 10/2015 |

OTHER PUBLICATIONS

LG Electronics, "Discussion on Resource Allocation for D2D Synchronization," 3GPP TSG RAN WG1 Meeting #76bis, R1-141356, Shenzhen, China, Mar. 31-Apr. 4, 2014 (Mar. 22, 2014), pp. 1-4.

* cited by examiner (A) CONTROL-PLANE PROTOCOL STACK (B) USER-PLANE PROTOCOL STACK

METHOD FOR TRANSMITTING SYNCHRONIZATION SIGNAL FOR DIRECT DEVICE-TO-DEVICE COMMUNICATION IN WIRELESS COMMUNICATION SYSTEM, AND APPARATUS THEREFOR

CROSS REFERENCE TO RELATED APPLICATIONS

This application is the National Phase of PCT International Application No. PCT/KR2015/003710, filed on Apr. 14, 2015, which claims priority under 35 U.S.C. 119(e) to U.S. Provisional Application No. 61/979,495, filed on Apr. 14, 2014, to U.S. Provisional Application No. 61/986,061, filed on Apr. 29, 2014, to U.S. Provisional Application No. 61/993,285, filed on May 15, 2014, and to U.S. Provisional Application No. 62/010,998, filed on Jun. 11, 2014, all of which are hereby expressly incorporated by reference into the present application.

TECHNICAL FIELD

The present invention relates to a wireless communication system, and more particularly, to a method for transmitting a synchronization signal for direct device-to-device communication in a wireless communication system and an apparatus therefor.

BACKGROUND ART

As a representative example of a wireless communication system of the present invention, 3rd Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Evolved Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DISCLOSURE

Technical Problem

An object of the present invention devised to solve the problem lies in the method for transmitting a synchronization signal for direct device-to-device communication in a wireless communication system and an apparatus therefor.

Technical Solution

The object of the present invention can be achieved by providing a method for transmitting a synchronization signal for direct device-to-device communication by a terminal in a wireless connected system, the method including configuring power parameters of the synchronization signal for the direct device-to-device communication through a higher layer, receiving a transmit power control (TPC) command for the direct device-to-device communication from a base station, determining a transmit power of the synchronization signal for the direct device-to-device communication, based on the transmit parameter and the TPC command, and transmitting the synchronization signal for the direct device-to-device communication according to the determined transmit power, wherein the TPC command is for a data channel for the direct device-to-device communication.

In another aspect of the present invention, provided herein is a terminal for performing direct device-to-device communication in a wireless communication system, the terminal including a wireless communication module configured to transmit and receive a signal to and from another terminal or a network, and a processor configured to process, the signal, wherein the processors configured to control the wireless communication module to determine a transmit power of a synchronization signal for the direct device-to-device communication, based on transmit parameters of the synchronization signal for the direct device-to-device communication configured through a higher layer and a transmit power control (TPC) command for the direct device-to-device communication from a base station, and transmit the synchronization signal for the direct device-to-device communication according to the determined transmit power, wherein the TPC command is for a data channel for the direct device-to-device communication.

In the above aspects, the power parameter may be preferably configured independently from the data channel for the direct device-to-device communication, and the TPC command may instruct at least one of the power parameters to switch to infinity or 0. In addition, the TPC command may be received over a physical control channel for the direct device-to-device communication.

Preferably, the data channel for the direct device-to-device communication may be transmitted according to resource allocation information of the base station.

Advantageous Effects

According to embodiments of the present invention, a synchronization signal for direct device-to-device communication may be more efficiently transmitted and received.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
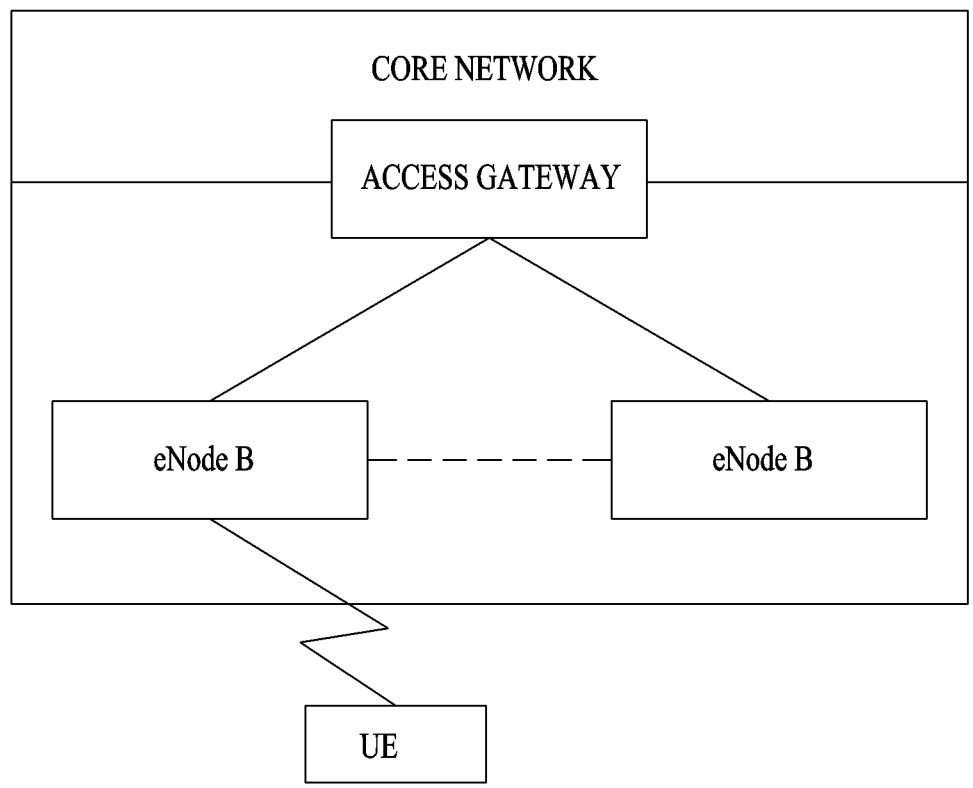
FIG. 1 is a diagram schematically illustrating a network structure of an E-UMTS as an exemplary radio communication system.
Figure 2:
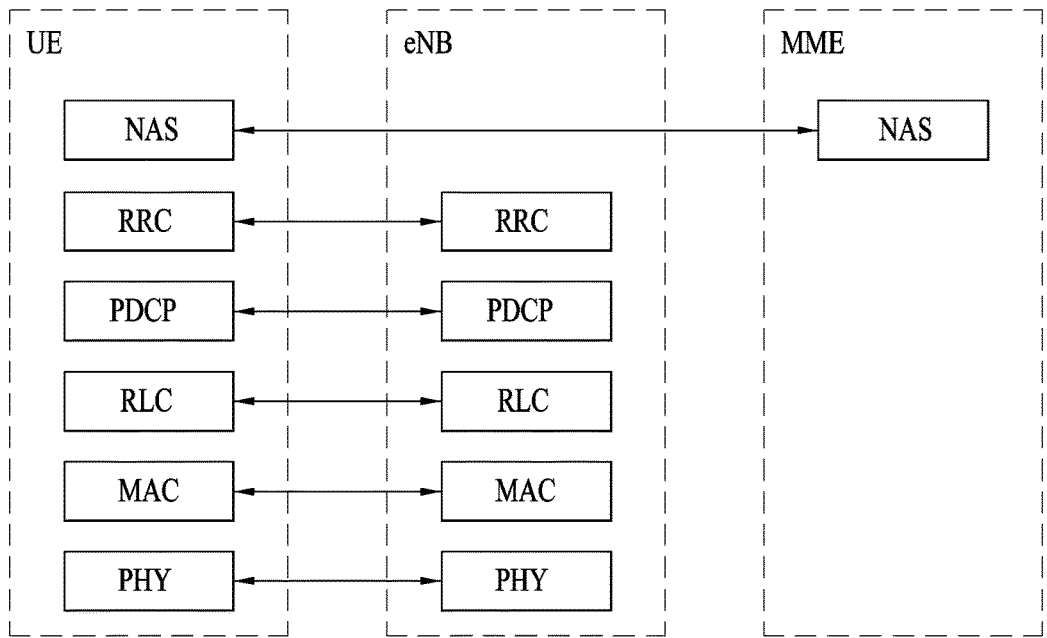
FIG. 2 is a diagram illustrating structures of a control plane and a user plane of a radio interface protocol between a UE and an E-UTRAN based on the 3GPP radio access network specification.
Figure 2:
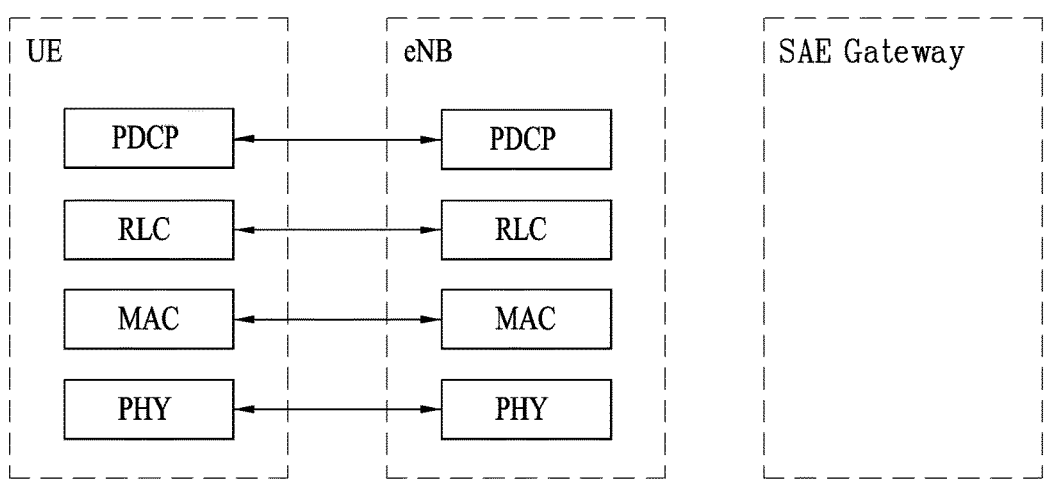

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is set to one of bandwidths of 1.25, 2.5, 5, 10, 15, and 20 MHz to provide a downlink (DL) or uplink (UL) transmission service to multiple UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
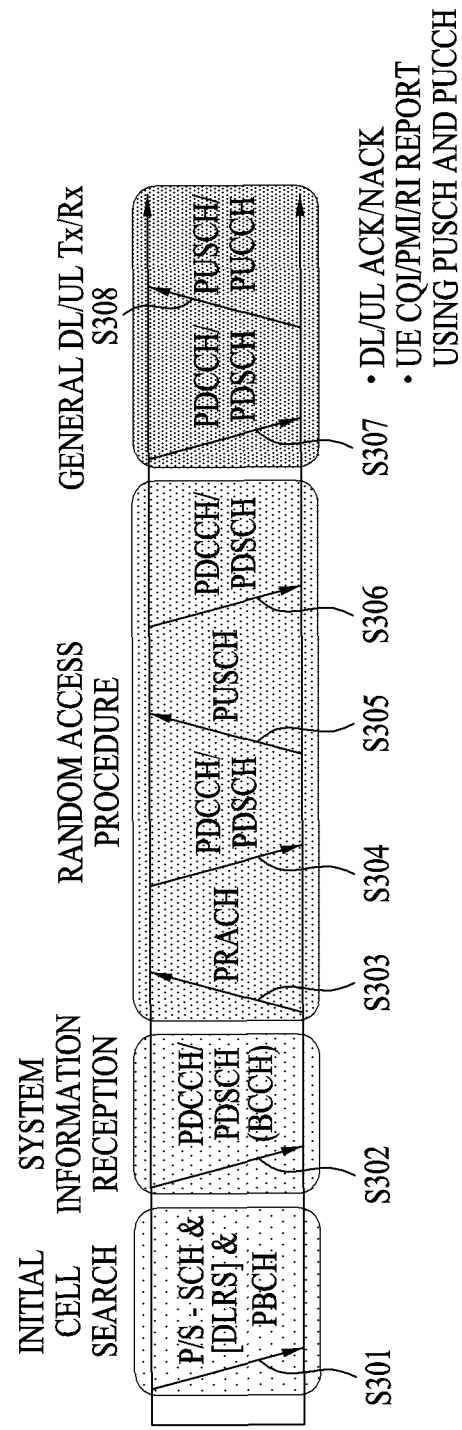
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
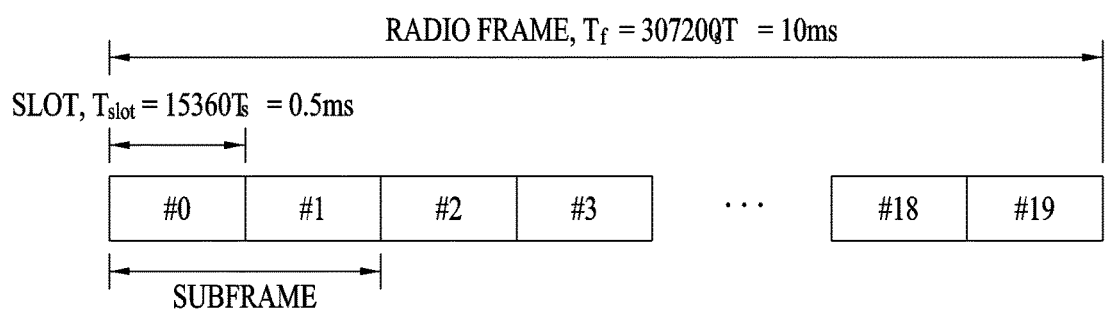
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
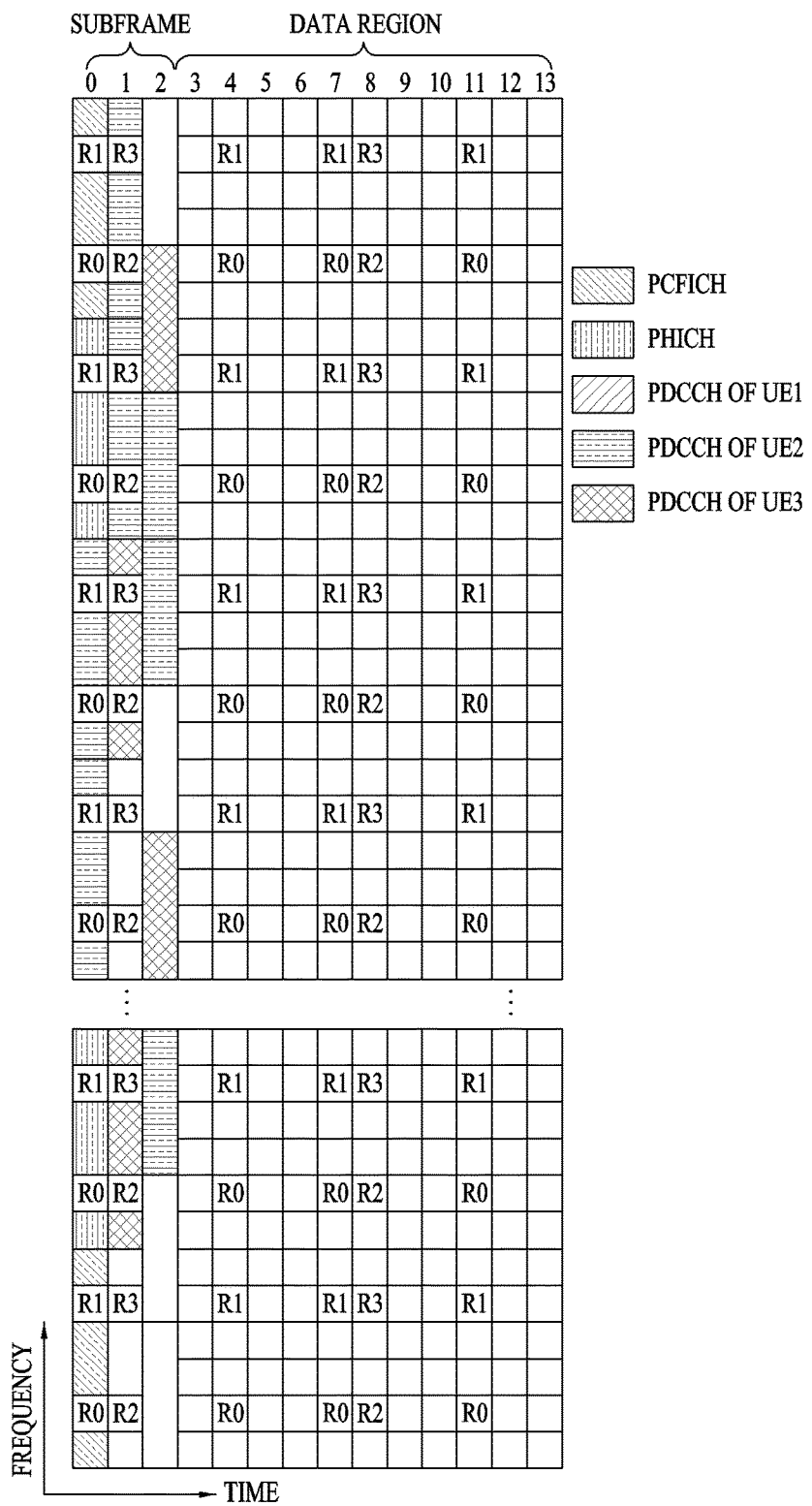
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
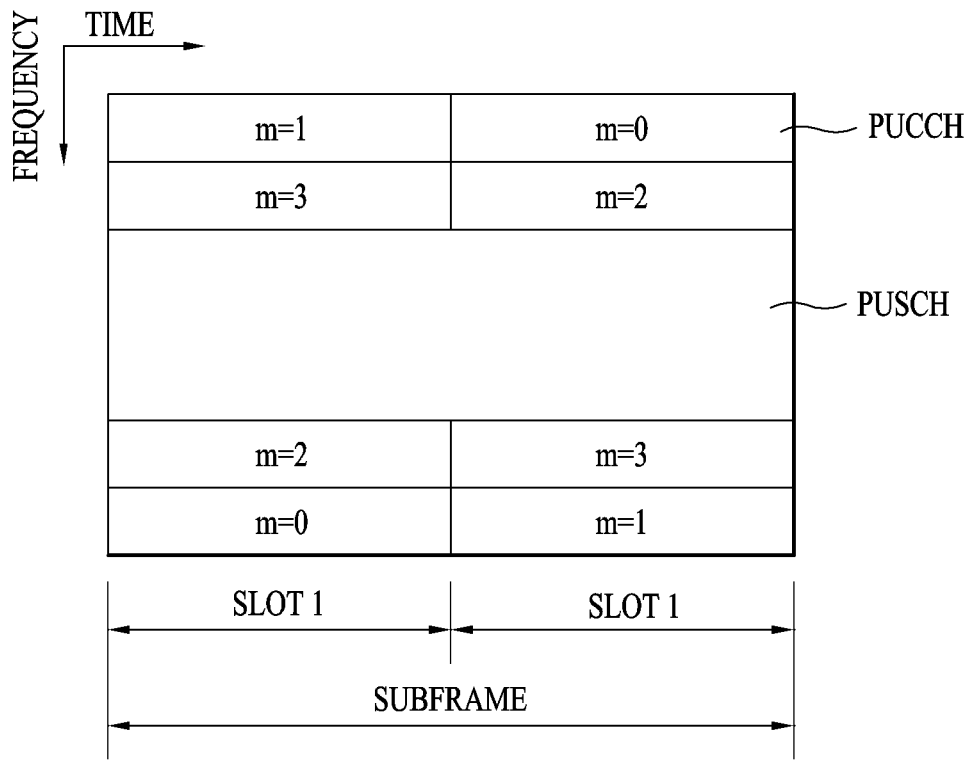
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(i)=1$ when j is 2. $\alpha_c(i)$ is a value signaled to the UE by the base station.

Pathloss $PL_c$ is a downlink pathloss (or signal loss) estimate value in dBs, calculated by the UE, and is represented as $PL_c$=referenceSignalPower–higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}[dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$K_{PUSCH}$ is defined in LTE as follows.

For FDD (Frequency Division Duplex), $K_{PUSCH}$ has a value of 4. As to TDD, $K_{PUSCH}$ has values as shown in Table 1.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}[dBm] \quad \text{[Equation 2]}$$

TABLE 1

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 2 or one of SET2 of Table 3, determined by a TPC-index parameter provided by the higher layer.

TABLE 2

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}$+$\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 4 and 5 show $\delta_{PUCCH}$ indicated by a TPC command in DCI formats. Particularly, Table 4 shows $\delta_{PUCCH}$ indicated in DCI formats other than DCI format 3A and Table 5 shows $\delta_{PUCCH}$ indicated in DCI format 3A.

TABLE 4

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5

| TPC Command Field in DCI format 3A | $\delta_{PUCCH}$ [dB] |
|---|---|
| 0 | −1 |
| 1 | 1 |

Equation 4 below relates to control of power of a sounding reference signal (SRS) in an LTE system.

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} [dBm] \quad \text{[Equation 3]}$$

$$P_{SRS,c}(i) = \min\left\{\begin{array}{l}P_{CMAX,c}(i)\\P_{SRS\_OFFSET,c}(m) + 10\log_{10}(M_{SRS,c}) + P_{O\_PUSCH,c}(j) + \alpha_c(j) \cdot PL_c + f_c(i)\end{array}\right\}[dBm] \quad \text{Equation 4}$$

In Equation 4, i is a subframe index, and c is a subframe index. Herein, $P_{CMAX,c}(i)$ denotes the maximum transmittable power of the UE, and $P_{SRS\_OFFSET,c}(m)$ which has a value set from a higher layer, corresponds to a periodic SRS when m is 0 and to an aperiodic SRS when m is 1. $M_{SRS,c}$ is a bandwidth of an SRS on subframe i of a serving cell c and is represented by the number of resource blocks.

$f_c(i)$ has a value indicating a current adjusted state of PUSCH transmit power for subframe i of the serving cell c, and $P_{O\_PUSCH,c}(j)$ and $\alpha_c(j)$ are defined as described in Equations 1 and 2.

Figure 7:
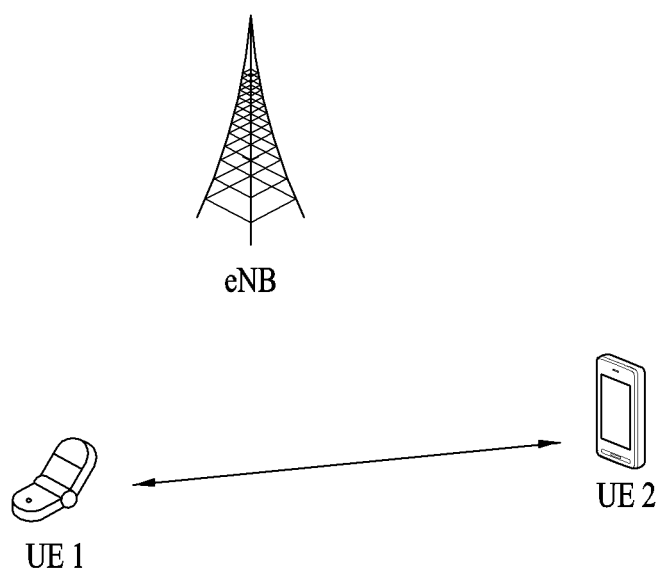
FIG. 7 is a conceptual diagram illustrating D2D communication.

FIG. 7 is a conceptual diagram illustrating D2D direct communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

In D2D communication, a transmission side and a reception side need to be synchronized in terms of time and frequency. To this end, at least one part of transmit UEs may transmit a synchronization signal which informs a basis of time/frequency synchronization. This synchronization signal is referred to as a D2D synchronization signal (D2DSS). When a D2DSS transmitted from a neighboring transmit UE is detected, some transmit UEs may match synchronization with the detected D2DSS, thereby being capable of communicating with a receive UE, which is synchronized with the D2DSS, without transmitting a separate D2DSS.

As described above, when some transmit UEs may synchronize with a D2DSS of another transmit UE, the total number of transmitted D2DSSs may be reduced. Accordingly, power consumption of the UEs and interference between D2DSSs may be lowered. To this end, a method for effectively transmitting D2DSSs is discussed below.

Figure 8:
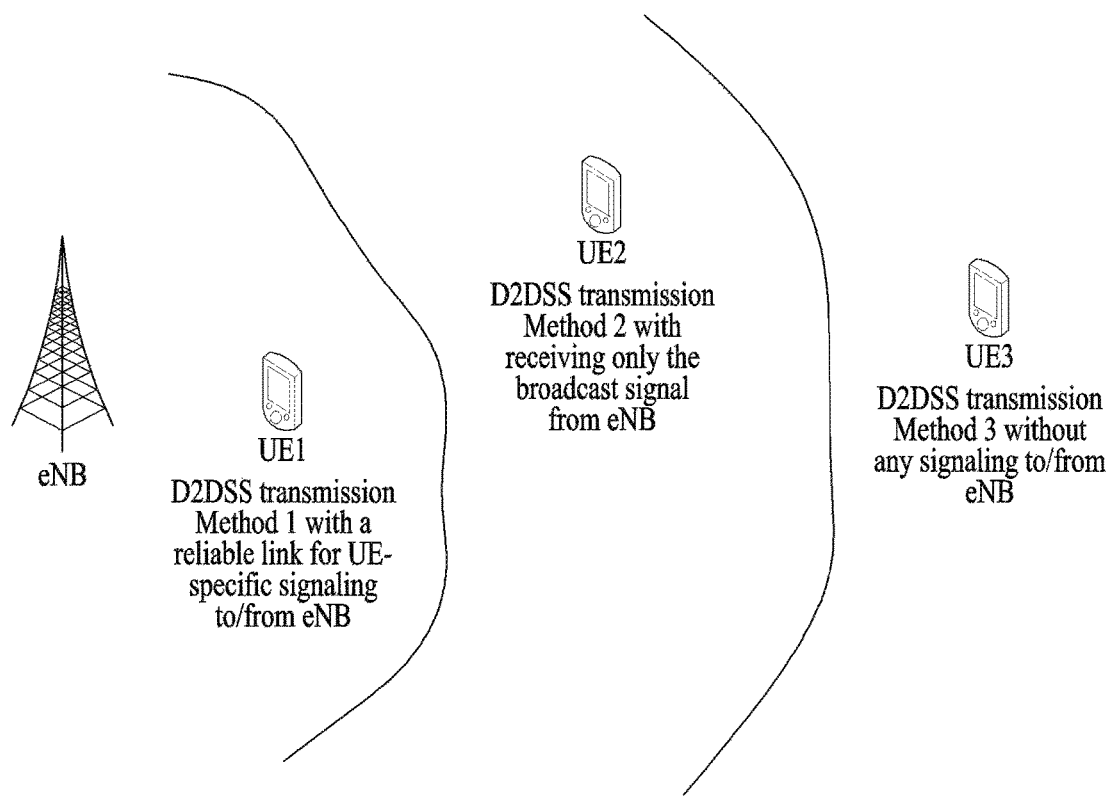
FIG. 8 illustrates a method for transmitting D2DSSs according to an embodiment of the present invention.

FIG. 8 illustrates a method for transmitting D2DSSS according to an embodiment of the present invention. In particular, FIG. 8 assumes a situation where only a few eNBs are responsible for a wide region, and thus access to eNBs is unstable or impossible in some areas because a sufficient number of eNBs is not installed in the network, or eNBs are destroyed due to a disaster such as an earthquake.

(1) Basically, for UEs e.g., for UE 1 of FIG. 8, capable of smoothly communicating with an eNB, the eNB may directly designate a UE which will transmit a D2DSS, through a UE specific signal. The eNB may recognize approximate positions of UEs through radio resource management (RMM) measurement reports from the UEs, and accordingly may select a D2DSS transmit UE at an appropriate distance. This scheme of the eNB instructing transmission of a D2DSS of an individual UE is referred to as a D2DSS transmission determination method 1.

In D2DSS transmission determination method 1, the eNB may signal, to the individual UE, the position of a resource to be used for D2DSS transmission and a seed value to be used for generation of a sequence of the D2DSS. Additionally, a transmit power value to be used for D2DSS transmission or a parameter for adjusting the transmit power may be signaled. If the parameter for adjusting the transmit power of the D2DSS is signaled, the transmit power of the D2DSS may be represented by Equation 1, similar to the transmit power of a typical NU link (Of course, some parameters of Equation 1 may be omitted). In this case, the eNB may signal the values of parameters such as $P_{O\_PUSCH,c}(j)$ and $\alpha_c(i)$ to the individual UEs.

In particular, these parameters for the D2DSS may be configured separately from the parameter for the NU link and parameters of the other channels (e.g., the D2D data channel) of a D2D link. However, $f_c(i)$, which is a closed-loop parameter determined by a TPC command, may be identical to the parameter of the D2D data channel. In other words, channels subjected to a TPC include not only a D2D data channel but also D2DSS and a synchronization signal associated therewith. For example, open-loop parameters from among the parameters for the D2DSS may be configured independently from the open-loop parameters of the D2D data channel, and the closed-loop parameter $f_c(i)$ may be used in the same manner as for the D2D data channel. Accordingly, when power for the D2D is instantaneously insufficient, the power for the D2D data and the powers for the D2DSS and a synchronization channel associated therewith may be increased together. Thereby, instantaneous change in situation may be handled without additional signaling overhead.

In particular, in this case, $f_c(i)$ is either 0 or a nearly infinite value. The value of $f_c(i)$ may be determined by the TPC of the eNB. When this operation is applied to Equation 1, Equations 5 and 6 below may be obtained. In particular, Equation 5 is given when $f_c(i)$ is 0, and Equation 6 is given when $f_c(i)$ is a nearly infinite value.

$$P_{PUSCH,c}(i) = \min\left\{\begin{array}{l}P_{CMAX,c}(i),\\10\log_{10}(M_{PUSCH,c}(i)) + P_{O\_PUSCH,c}(j) + \alpha_c(j) \cdot PL_c + \Delta_{TF,c}(i)\end{array}\right\}[dBm] \quad \text{Equation 5}$$

$$P_{PUSCH,c}(i) = P_{CMAX,c}(i)[dBm] \quad \text{Equation 6}$$

Alternatively, the transmit power of a D2DSS may be determined in a manner of assigning a certain offset to the transmit power of a D2D data channel. The value of the offset may be signaled by the eNB.

(2) When a UE moves away from the eNB, only basic information (e.g., information broadcast through system information) transmitted by the eNB to ensure very high reliability may be possibly received, and the UE may be positioned in an area where stable transmission and reception of the UE specific signal is difficult. This is the case of UE 2 of FIG. 8. In this case, the D2D transmit UE preferably matches synchronization with a synchronization signal provided from the eNB. This is because the eNB may maintain more stable synchronization than the UE, and receiving broadcast information means that synchronization with the corresponding eNB is stable. Accordingly, at least one part of such transmit UEs should transmit a D2DSS which may form the basis of synchronization with other UEs, while matching synchronization with the eNB. In this environment, it is inappropriate to use D2DSS transmission determination method 1 through a UE specific signal, and thus other methods need to be used.

As one method, the eNB may broadcast, through system information, resources usable for a D2DSS and/or a seed value to be used for generation of one or more D2DSS sequences, and a UE receiving the same may autonomously determine whether or not to transmit a D2DSS according to a predetermined rule. This method is referred to as D2DSS transmission determination method 2. As a specific example of operation of D2DSS transmission determination method 2, the UE checks if there is any D2DSS transmitted by other UEs. If any D2DSS transmitted by other UEs is not detected or a certain condition is not satisfied when a D2DSS transmitted by another UE is detected, the UE transmits a D2DSS using a resource and a seed value signaled by the eNB. In particular, in D2DSS transmission determination method 2, probabilistic transmission of a D2DSS is possible. That is, the D2DSS is not transmitted immediately. Rather, transmission of the D2DSS is attempted according to a certain probability. Thereby, possibility of two neighboring UEs simultaneously transmitting D2DSSs may be reduced. On the other hand, if a D2DSS transmitted by another UE and satisfying the certain condition is detected in checking if there is any D2DSS transmitted by other UEs, the UE may operate to stop D2DSS transmission.

In D2DSS transmission determination method 2, D2DSS transmission may be attempted even if a D2DSS of another UE is detected, on the condition that the detected D2DSS of another UE has a quality lower than a certain level, for example, a transmit power lower than a certain level. This condition is intended to allow a UE to transmit a D2DSS only if the UE is at a certain distance. Another example condition for attempting D2DSS transmission may be that the detected D2DSS is transmitted by a UE which is not synchronized with the eNB, using D2DSS transmission determination method 3, which will be described later. This condition is intended to give higher priority to a UE which is synchronized with the eNB and conforming to D2DSS transmission determination method 2 such that the UE employing D2DSS transmission determination method 3 matches synchronization with the UE conforming to D2DSS transmission determination method 2.

This means that attempting to perform D2DSS transmission is stopped when a D2DSS transmitted using D2DSS transmission determination method 1 or D2DSS transmission determination method 2 is detected (with a quality higher than a certain level). Herein, the D2DSS detected by the UE according to D2DSS transmission determination method 1 or D2DSS transmission determination method 2 is limited to a D2DSS which uses a resource and seed value provided from a cell to which the UE is connected. This is because a D2DSS transmitted from a neighboring cell may be detected, but may not be perfectly synchronized with the UE, and thus it is preferable for the UE to transmit a separate D2DSS.

(3) If the UE moves further away from the eNB and thus it is impossible to achieve synchronization from the eNB (wherein whether or not achieving synchronization from the eNB may be represented by a condition for the reception quality of a signal of the eNB), it becomes impossible to use the D2DSS resource or seed value signaled by the eNB. In this case, the UE needs to transmit the D2DSS without matching synchronization with the eNB. This scheme may be referred to as D2DSS transmission determination method 3. Except that the eNB broadcasts a D2DSS resource or seed value, D2DSS transmission determination method 3 is similar to D2DSS transmission determination method 2 in that the UE autonomously determines whether or not to perform D2DSS transmission. That is, in D2DSS transmission determination method 3, the UE checks if there is any D2DSS transmitted by other UEs. If a D2DSS transmitted by other UEs is not detected or if a certain condition is not satisfied when a D2DSS transmitted by another UE is detected, the UE transmits a D2DSS using a resource and a seed value signaled by the eNB. In this case, probabilistic transmission of the D2DSS is also possible. That is, the D2DSS is not transmitted immediately. Rather, transmission of the D2DSS is attempted according to a certain probability. Thereby, possibility of two neighboring UEs transmitting D2DSSs simultaneously may be reduced.

Probabilistically determining to stop D2DSS transmission may be implemented in a manner that each UE determines whether or not to continue to transmit a D2DSS with a certain probability at every time for D2DSS transmission. Alternatively, the probabilistic determination may be implemented in a manner of probabilistically selecting a time to transmit the D2DSS in the future. On the other hand, if a D2DSS transmitted by another UE and satisfying the certain condition is detected in checking if there is any D2DSS transmitted by other UEs, the UE may operate to stop D2DSS transmission.

According to the description above, when a UE detects a D2DSS transmitted by another UE, the UE needs to identify the method that is employed in transmitting the detected D2DSS. This challenge may be addressed by associating the seed value of the D2DSS with a D2DSS transmission determination method. For example, all seed values usable for the D2DSS are divided into three sets, and each set is associated with one D2DSS transmission determination method. Thereby, when a specific D2DSS transmission determination method is used, a seed value of a D2DSS associated therewith may be used. Of course, if two or more seed values are associated with one D2DSS transmission determination method, one of the associated seed values may be probabilistically selected and used. In particular, when the UE employees D2DSS transmission determination method 3, a seed value associated with D2DSS transmission determination method 3 should be used. For the other D2DSS transmission determination methods, the eNB may appropriately designate seed values.

Alternatively, to facilitate operation, all seed values of D2DSS may be divided into only two sets, namely, a seed value set used by UEs within the coverage, namely UEs conforming to D2DSS transmission determination method 1 and D2DSS transmission determination method 2 and a seed value set used by UEs outside the coverage, namely UEs conforming to D2DSS transmission determination method 3. In this case, D2DSS transmission determination method 1 may be distinguished from D2DSS transmission determination method 2 by a configuration designated by the eNB. That is, the eNB may separately designate a seed value of D2DSS that a UE conforming to D2DSS transmission determination method 1 and a UE conforming to D2DSS transmission determination method 2 will use. If this information is broadcast as a kind of system information, all UEs may identify these seed values.

Hereinafter, switching between the aforementioned D2DSS transmission determination methods will be described.

Switching between D2DSS transmission determination method 1 and D2DSS transmission determination method 2 may be performed based on the quality of an eNB signal. For example, if the receive power of a reference signal transmitted by the eNB is higher than a certain level, D2DSS transmission determination method 1 may be used. If the receive power is lower than the certain level, the D2DSS transmission determination method may be switched to D2DSS transmission determination method 2. To prevent frequent switching between the methods according to instantaneous change in the receive power, the switching may be configured to be performed only when the signal quality remains higher or lower than a reference for a certain time, and the eNB may signal the quality value of the eNB signal that forms the basis of the switching operation via system information or the like. Specifically, D2DSS transmission determination method 1 may be switched to D2DSS transmission determination method 2 according to one of methods (a) and (b) given below.

(a) When a UE transmitting a D2DSS using D2DSS transmission determination method 1 moves away from the eNB and thus finds that the receive power of the D2DSS is decreased below a reference value, the UE stops transmitting the D2DSS according to D2DSS transmission determination method 1, and switches to D2DSS transmission determination method 2. This operation is effective when D2DSS transmission determination method 1 is clearly distinguished from D2DSS transmission determination method 2. In this case, the UE may report, to the eNB, that the UE will switch to D2DSS transmission determination method 2. Based on the report, the eNB may indicate whether or not to continue transmission of the D2DSS.

(b) Even if the UE transmitting a D2DSS using D2DSS transmission determination method 1 moves away from the eNB and thus finds that the receive power of the D2DSS decreases below the reference value, the existing D2DSS transmission is continued as long as it is possible to maintain synchronization with the eNB. This operation is advantageous in that the frequency of switching between the transmission methods for D2DSS is minimized. In this case, the D2DSS seed value for D2DSS transmission determination method 1 may not be distinguished from the D2DSS seed value for D2DSS transmission determination method 2. When this operation is applied, the aforementioned criterion for the eNB signal quality may be limitedly applied only when UEs which are not transmitting D2DSSs attempt to perform D2DSS transmission. Still in this case, the UEs may report, to the eNB, that they will switch to D2DSS transmission determination method 2, and the eNB may indicate whether or not to stop D2DSS transmission based on the reports.

Similarly, switching from D2DSS transmission determination method 2 to D2DSS transmission determination method 1 may be performed by selecting one of methods (c) and (d) given below.

(c) When a UE transmitting a D2DSS using D2DSS transmission determination method 2 finds that the receive power becomes greater than or equal to a reference value, the UE operates to stop transmitting the D2DSS according to D2DSS transmission determination method 2 and switches to D2DSS transmission determination method 1. In this switching operation, the UE may transmit, to the eNB, a signal for requesting that the UE transmit a D2DSS according to D2DSS transmission determination method 1. In particular, the UE may perform such reporting when the UE fails to receive a D2DSS transmitted by another UE. Herein, the D2DSS transmitted by the other UE may be limited to a D2DSS transmitted according to D2DSS transmission determination method 1 or a D2DSS synchronized with the eNB.

Preferably, upon receiving the signal for requesting that a D2DSS be transmitted, the eNB indicates, to the UE, D2DSS transmission according to D2DSS transmission determination method 1. Alternatively, the UE may report detected D2DSS information about another UE (e.g., the resource position, seed value, intensity of receive power and the like of the detected D2DSS). Based on the report, the eNB may determine whether or not it is appropriate for the UE to transmit a D2DSS. Of course, such reporting to the eNB may also be performed by a UE which intends to use D2DSS transmission determination method 1 to newly initiate D2D communication.

(d) Even if the receive power is found to be greater than or equal to the reference value during transmission of the D2DSS using D2DSS transmission determination method 2, existing D2DSS transmission may be maintained. In this case, the UE may report, to the eNB, information about the D2DSS that the UE is transmitting including the resource position, seed value and transmit power of the D2DSS. If the eNB commands the UE to stop transmitting the D2DSS or indicates another transmission method of the D2DSS as D2DSS transmission determination method 1, the UE stops the existing D2DSS transmission according to the command or indication.

While the reception quality of an eNB signal is used as a condition for switching between D2DSS transmission determination method 1 and D2DSS transmission determination method 2 in the description of the methods above, embodiments of the present invention are not limited thereto. Other conditions may also be used. For example, if a UE establishes connection with the eNB and stays in the RRC CONNECTED state, the UE may use D2DSS transmission determination method 1 which enables UE specific signaling. If the UE is in the RRC IDLE state in which connection with the eNB is not established, UE specific signaling is impossible, and thus the UE may use D2DSS transmission determination method 2. The D2DSS transmission determination method may be changed depending on the state to which the UE switches.

As another example, a D2DSS transmission determination method may be associated with a D2D data transmission method. Specifically, D2DSS transmission determination method 1, which requires an individual indication from the eNB, is used when resources for D2D data signal transmission are allocated based on the individual indication. On the other hand, D2DSS transmission determination method 2, which does not require an individual indication from the eNB, may be used when the UE determines transmission resources for the D2D data signal without the individual indication of the eNB. In particular, switching between D2DSS transmission determination methods may be accompanied by switching between D2D data transmission methods. If an available D2DSS seed value differs between the D2DSS transmission determination methods, other UEs may recognize a D2D data transmission method to be used to transmit data, by detecting D2D SS.

As described above, it is not preferable for two UEs located at very close positions (e.g., the receive power of the D2DSSs is greater than or equal to a specific reference value) to transmit D2DSSs. In this case, it is appropriate that only one of the UEs transmit a D2DSS, and the other UE matches synchronization with the transmitted D2DSS. Herein, the UE matching synchronization with the other UE may transmit a D2DSS according to the synchronization, thereby serving to relay the synchronization. If D2DSS transmission determination method 2 or D2DSS transmission determination method 3 is used when a new UE appears while one of the UEs is transmitting the D2DSS, the UE discovers the existing transmitted D2DSS in detecting an existing D2DSS before performing D2DSS transmission, and thus does not perform D2DSS transmission. That is, the UE transmitting the existing D2DSS is prioritized.

However, if a D2DSS transmit UE moves and approaches another UE which is transmitting a D2DSS, the two UEs may stop transmitting D2DSSs, and thus no D2DSS is temporarily present. In this case, the two UEs may probabilistically determine to stop D2DSS transmission. Thereby, when one UE stops D2DSS transmission, the other UE may operate to continue D2DSS transmission. That is, when one UE probabilistically stops D2DSS transmission, the other UE continues to perform D2DSS transmission since it is capable of observing the operation of the other UE. The UE stopping D2DSS transmission may match synchronization with the D2DSSs of the remaining UEs, and then transmit a D2DSS for relaying the synchronization. In this case, the transmission timing of the D2DSS and other D2DSS transmission parameters may change, and accordingly the UE stops transmitting the existing D2DSS that the UE has transmitted.

Herein, probabilistically determining to stop D2DSS transmission may be implemented in a manner that the UE determines whether or not to continue to transmit a D2DSS with a certain probability at every D2DSS transmission time, or in a manner that a time to transmit a D2DSS in the future is probabilistically selected, or a UE to stop D2DSS transmission is determined depending on whether a probabilistically set value such as a seed value for generation of a D2DSS sequence or ID of the UE is large or small. If the probabilistically set value is designated at the time for setting the UE, a set value may be viewed as being probabilistically selected and input for each UE such that the set values of the respective UEs are not equal to each other.

Of course, the above case assumes that D2DSSs of the two UEs have the same priority. For example, this is the case when the same D2DSS transmission determination method is used or the same priority is applied to D2DSS selection. If the priority of the D2DSS of one UE is lower than the priority of the D2DSS of the other UE, transmission of the D2DSS having the lower priority is automatically stopped. For example, if higher priority is assigned to a D2DSS that has been generated earlier, the lapse time after generation of each D2DSS may represent a priority. In this case, the operation of probabilistically stopping D2DSS transmission may be restrictively performed only when there are D2DSSs having the same lapse time. As another example, when a UE matches synchronization with a D2DSS of another UE and performs multi-hop relay of the synchronization, higher priority may be assigned to a D2DSS having a lower number of hops. In this case, the operation of probabilistically stopping D2DSS transmission may be limitedly performed only when D2DSSs having the same number of hops are observed.

To apply a similar operation to D2DSS transmission determination method 1, the UE may operate to report, to the eNB, a D2DSS transmitted by another UE if the receive power of the D2DSS of the other UE is greater than or equal to a specific reference value (and the transmitted D2DSS additionally has the same priority as the D2DSS of the UE), and the eNB may instruct the UE to stop D2DSS transmission based on the report.

The operation of a UE detecting a D2DSS and stopping its own D2DSS transmission may also be usefully applied to a case where a specific UE detects a D2DSS identical to the D2DSS that the specific UE is transmitting, but the detected D2DSS is not synchronized with the D2DSS transmitted by the specific UE. Specifically, while UE A is transmitting D2DSS X, the UE may detect D2DSS X of the same sequence transmitted by UE B. This situation may be encountered when two UEs which are too far from each other to sense each other select and transmit the same D2DSS X, and come close to each other over time. In this case, D2DSS X transmitted by one UE is generally not synchronized with D2DSS X transmitted by the other UE. Specifically, if the difference in symbol boundary between the D2DSSs is larger than or equal to a certain level (the length of time corresponding to a CP length or the CP length minus delay spread), or the frame numbers indicated through a synchronization channel associated with the D2DSSs differ from each other, it may be recognized that the two D2DSSs are not synchronized.

If it is recognized that the identical D2DSSs are transmitted without synchronization established between UE A and UE B, one of the two UEs preferably matches synchronization with the other UE. This is because it is unclear which sequence should be used and when the sequence should be used in view of a third UE when the identical D2DSS sequences are not synchronized. In this case, the operation of determining a UE to stop transmitting the D2DSS and match synchronization with the other UE may conform to the aforementioned operation of probabilistically stopping transmission. A UE that stops transmitting the D2DSS thereof, and matches synchronization with the D2DSS of the other UE may perform the operation of relaying the D2DSS, by transmitting the D2DSS thereof again according to the synchronization. Of course, if it is determined that the identical D2DSS Xs transmitted by the two UEs are synchronized, the UEs may continue to perform D2DSS transmission without performing a separate operation, unless the two UEs are very close to each other and thus the receive power of the D2DSSs decreases below the aforementioned certain level.

Meanwhile, the method for determining whether or not two D2DSSs are synchronized by checking if the frame numbers indicated through the synchronization channel associated with the D2DSSs coincide may be useful even in the case where the two D2DSSs use different sequences. Typically, when M bits are used in indicating a frame number, a probability of the same frame number being used for the D2DSSs may be as low as $1/2M$. If a probability of the frame boundary of the two D2DSSs being within a certain level is added, the probability of the same frame number being used for the D2DSSs may be further lowered. Accordingly, even if sequences of two detected D2DSSs differ from each other, the UE may consider the D2DSSs as being synchronized with each other as long as the subframe boundary therebetween is within a certain error and the frame numbers of the D2DSSs coincide with each other. In addition, corrected frequencies estimated from the D2DSSs may be averaged. If the synchronization channel associated with the D2DSSs carries other kinds of information in addition to the frame numbers, whether or not synchronization is matched may be determined based on whether or not the other kinds of information coincide with each other. In this case, however, information specific to an individual D2DSS or a synchronization channel, for example, information such as the indexes of subframes in which D2DSSs and the synchronization channel are transmitted, should be processed separately. For example, when two D2DSSs and the synchronization channel are transmitted with two subframes placed therebetween, it should be considered that synchronization has been established if the subframe indexes contained in the synchronization channel differ by 2.

Meanwhile, it is possible to design an operation without distinction between D2DSS transmission determination method 2 and D2DSS transmission determination method 3. This is because the two operations have a common point in that the UE spontaneously determines whether or not to transmit a D2DSS. That is, a UE satisfying a condition for use of D2DSS transmission determination method 2 transmits a D2DSS using a D2DSS seed value that is used outside the coverage, as if the UE is placed outside the coverage. Then, when a UE satisfying a condition for use of D2DSS transmission determination method 1 recognizes this information, it may report this information to the eNB, and transmit a D2DSS using a seed value used within the coverage, and the UE, which has initially transmitted a D2DSS may now transmit this new received D2DSS to other UEs through multi-hop relay. To perform these operations, the eNB may designate a resource region in which a D2DSS can be transmitted using a D2DSS seed value that is used outside the courage, under the condition of D2DSS transmission determination method 2.

Figure 9:
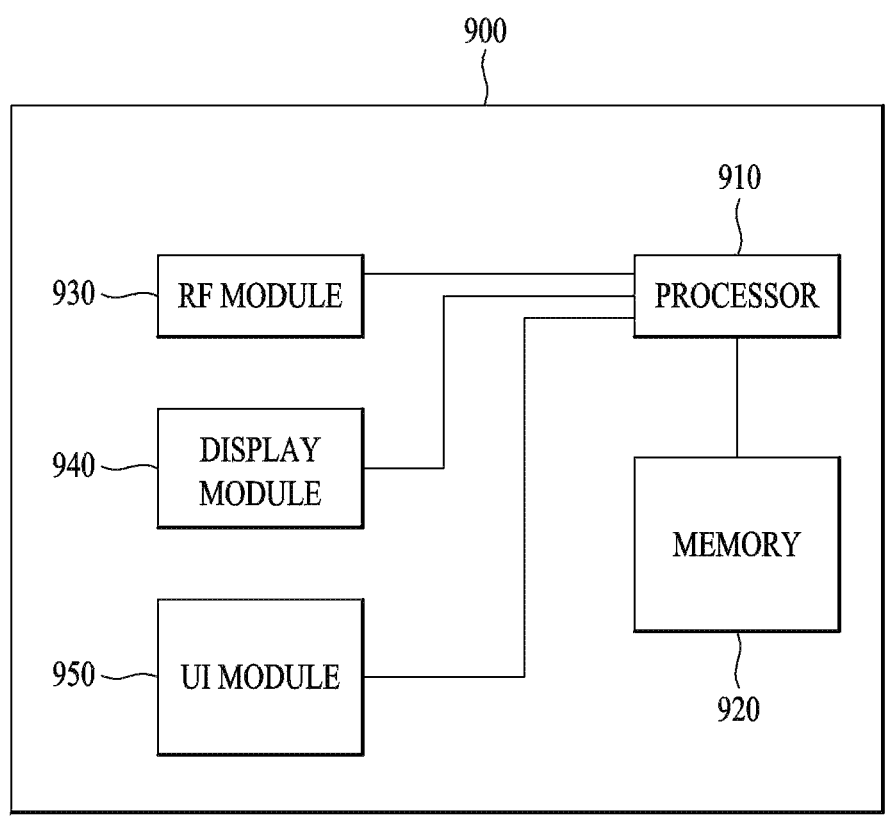
FIG. 9 is a block diagram illustrating a communication device according to embodiments of the present invention.

FIG. 9 is a block diagram of a communication apparatus according to an embodiment of the present invention.

Referring to FIG. 9, a communication device 900 includes a processor 910, a memory 920, a radio frequency (RF) module 930, a display module 940, and a user interface (UI) module 950.

The communication device 900 is illustrated for convenience of description and some modules may be omitted. The communication device 900 may further include necessary modules. Some modules of the communication device 900 may be further divided into sub-modules. The processor 900 is configured to perform operations according to the embodiments of the present invention exemplarily described with reference to the drawings. Specifically, for a detailed description of operations of the processor 900, reference may be made to the description described with reference to FIGS. 1 to 8.

The memory 920 is connected to the processor 910 and stores operating systems, applications, program code, data, and the like. The RF module 930 is connected to the processor 910 and performs a function of converting a baseband signal into a radio signal or converting a radio signal into a baseband signal. For this, the RF module 930 performs analog conversion, amplification, filtering, and frequency upconversion or performs inverse processes thereof. The display module 940 is connected to the processor 910 and displays various types of information. The display module 940 may include, but is not limited to, a well-known element such as a liquid crystal display (LCD), a light emitting diode (LED), or an organic light emitting diode (OLED). The UI module 950 is connected to the processor 910 and may include a combination of well-known UIs such as a keypad and a touch screen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

It is apparent to those skilled in the art that the present invention may be carried out in other specific ways than those set forth herein without departing from the characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for transmitting a synchronization signal for direct device-to-device communication in a wireless communication system and an apparatus therefor have been described above, focusing on a case where the present invention is applied to a 3GPP LTE system. However, it should be noted that the present invention is also applicable to various wireless communication systems other than the 3GPP LTE system.

The invention claimed is:

1. A method for transmitting a synchronization signal for a device-to-device (D2D) link by a user equipment (UE) in a wireless communication system, the method comprising:
receiving information about seed values for generating the synchronization signal for the D2D link from a base station,
wherein the seed values are divided into first type seed values and second type seed values corresponding to in-coverage of the base station and third type seed values corresponding to out-coverage of the base station,
wherein the first type seed values correspond to a transmission of the synchronization signal for the D2D link by an instruction of the base station, and
wherein the second and third seed values correspond to a transmission of the synchronization signal for the D2D link without the instruction of the base station;
configuring parameters related to transmission power of the synchronization signal for the D2D link through a higher layer;
receiving a transmit power control (TPC) command for a data signal of the D2D link from the base station;
determining the transmission power of the data signal of the D2D link based on the TPC command for the data signal of the D2D link;
determining the transmission power of the synchronization signal for the D2D link, based on the parameters related to the transmission power of the synchronization signal for the D2D link and the TPC command for the data signal of the D2D link;
generating the synchronization signal for the D2D link by using one of the first, second and third type seed values;
transmitting the synchronization signal for the D2D link according to the determined transmission power of the synchronization signal for the D2D link; and
transmitting the data signal for the D2D link according to the determined transmission power of the data signal for the D2D link.

2. The method according to claim 1, wherein the parameters are configured independently from the data signal of the D2D link.

3. The method according to claim 1, wherein the TPC command instructs at least one of the parameters to switch to infinity or 0.

4. The method according to claim 1, wherein the TPC command is received via a physical control channel of the D2D link.

5. The method according to claim 1, wherein a location of the UE is within a coverage of the base station.

6. The method according to claim 1, wherein the data signal of the D2D link is transmitted according to resource allocation information of the base station.

7. A user equipment (UE) for performing a device-to-device (D2D) link in a wireless communication system, the UE comprising:
a transceiver configured to transmit and receive a signal to and from another UE or a base station; and
a processor configured to process the signal,
wherein the processor is further configured to:
control the transceiver to receive information about seed values for generating the synchronization signal for the D2D link from the base station,
wherein the seed values are divided into first type seed values and second type seed values corresponding to in-coverage of the base station and third type seed values corresponding to out-coverage of the base station,
wherein the first type seed values correspond to a transmission of the synchronization signal for the D2D link by an instruction of the base station, and
wherein the second and third seed values correspond to a transmission of the synchronization signal for the D2D link without the instruction of the base station,
determine transmission power of a data signal of the D2D link based on a transmit power control (TPC) command for the data signal of the D2D link received from the base station,
determine transmission power of a synchronization signal for the D2D link, based on parameters related to the transmission power of the synchronization signal for the D2D link configured through a higher layer and the TPC command for the data signal of the D2D link from the base station,
generate the synchronization signal for the D2D link by using one of first, second and third type seed values,
control the transceiver to transmit the synchronization signal for the D2D link according to the determined transmission power of the synchronization signal for the D2D link, and
control the transceiver to transmit the data signal for the D2D link according to the determined transmission power of the data signal for the D2D link.

8. The UE according to claim 7, wherein the parameters are configured independently from the data channel for the D2D link.

9. The UE according to claim 7, wherein the TPC command instructs at least one of the parameters to switch to infinity or 0.

10. The UE according to claim 7, wherein the TPC command is received via a physical control channel of the D2D link.

11. The UE according to claim 7, wherein a location of the UE is within a coverage of the base station.

12. The UE according to claim 7, wherein the data signal of the D2D link is transmitted according to resource allocation information of the base station.

* * * * *